United States Patent [19]

Abbe et al.

[11] Patent Number: 4,910,453

[45] Date of Patent: Mar. 20, 1990

[54] MULTI-PROBE GROUPING SYSTEM WITH NONLINEAR ERROR CORRECTION

[75] Inventors: Robert C. Abbe, Newton; Noel S. Poduje, Needham Heights, both of Mass.

[73] Assignee: ADE Corporation, Newton, Mass.

[21] Appl. No.: 109,239

[22] Filed: Oct. 15, 1987

[51] Int. Cl.⁴ ............................................. G01R 27/26
[52] U.S. Cl. .................................... 324/663; 324/690
[58] Field of Search ................... 324/61 R, 61 P, 225, 324/229, 230, 61 QS, 61 QI, 61 CD

[56] References Cited

U.S. PATENT DOCUMENTS

| | | | |
|---|---|---|---|
| 3,930,404 | 1/1976 | Ryden, Jr. ...................... | 73/67.8 R |
| 3,990,005 | 11/1976 | Abbe et al. ...................... | 324/61 R |
| 4,071,820 | 1/1978 | Mushinsky ...................... | 324/61 R |
| 4,160,385 | 7/1979 | Gromlich et al. ................. | 73/622 |
| 4,211,971 | 7/1980 | Kobayashi et al. ................ | 324/61 R |
| 4,517,145 | 5/1985 | Knopf ............................ | 264/40.2 |
| 4,551,674 | 11/1985 | Miller ........................... | 324/158 R |
| 4,568,874 | 2/1986 | Kramer et al. ................... | 324/61 R |
| 4,569,445 | 2/1986 | Kovats et al. ................... | 209/539 |
| 4,577,588 | 3/1986 | Mautref et al. .................. | 118/665 |

Primary Examiner—Reinhard J. Eisenzopf
Assistant Examiner—Walter E. Snow
Attorney, Agent, or Firm—Weingarten, Schurgin, Gagnebin & Hayes

[57] ABSTRACT

An error compensated thickness measuring system utilizing first and second probes placed on opposite sides of a semiconductor wafer whose thickness is to be measured. The output of the probes is linearized and electronically processed to provide a signal representative of the thickness of the semiconductor wafer. The electronic processing includes an error compensating circuit which removes higher order error in the thickness signal attributable to the wafer being other than precisely centered between the two probes. The error compensating circuitry operates to produce a scaled higher order representation of the displacement of the wafer from the centered condition to combine this with the thickness signal to produce an error compensated signal. The present invention finds particular application in the thickness gauging of semiconductor wafers which represent a substantial impedance to circuit common and in which compensating circuitry is utilized to adjust for or control the potential of the ungrounded object.

11 Claims, 2 Drawing Sheets

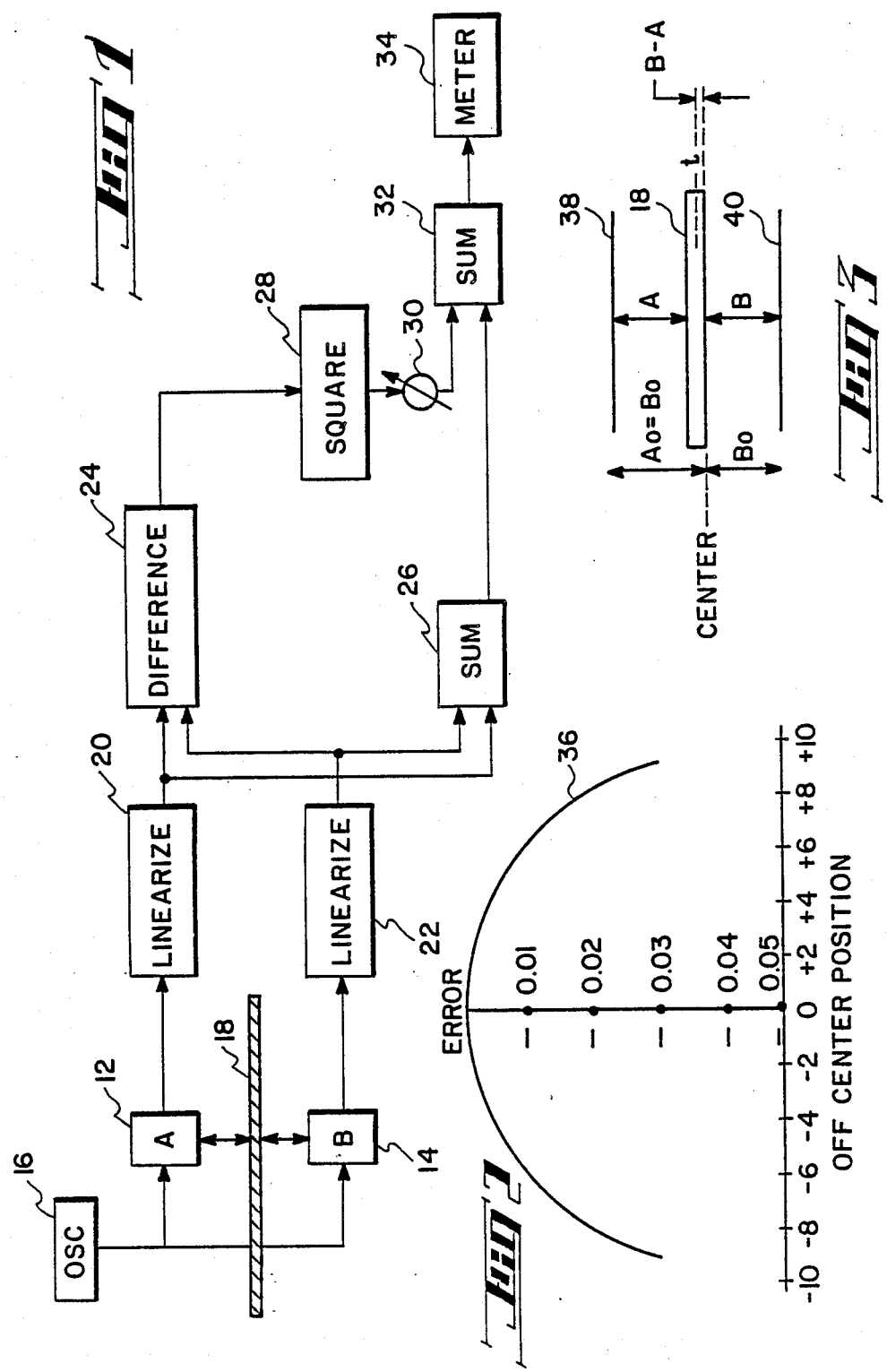

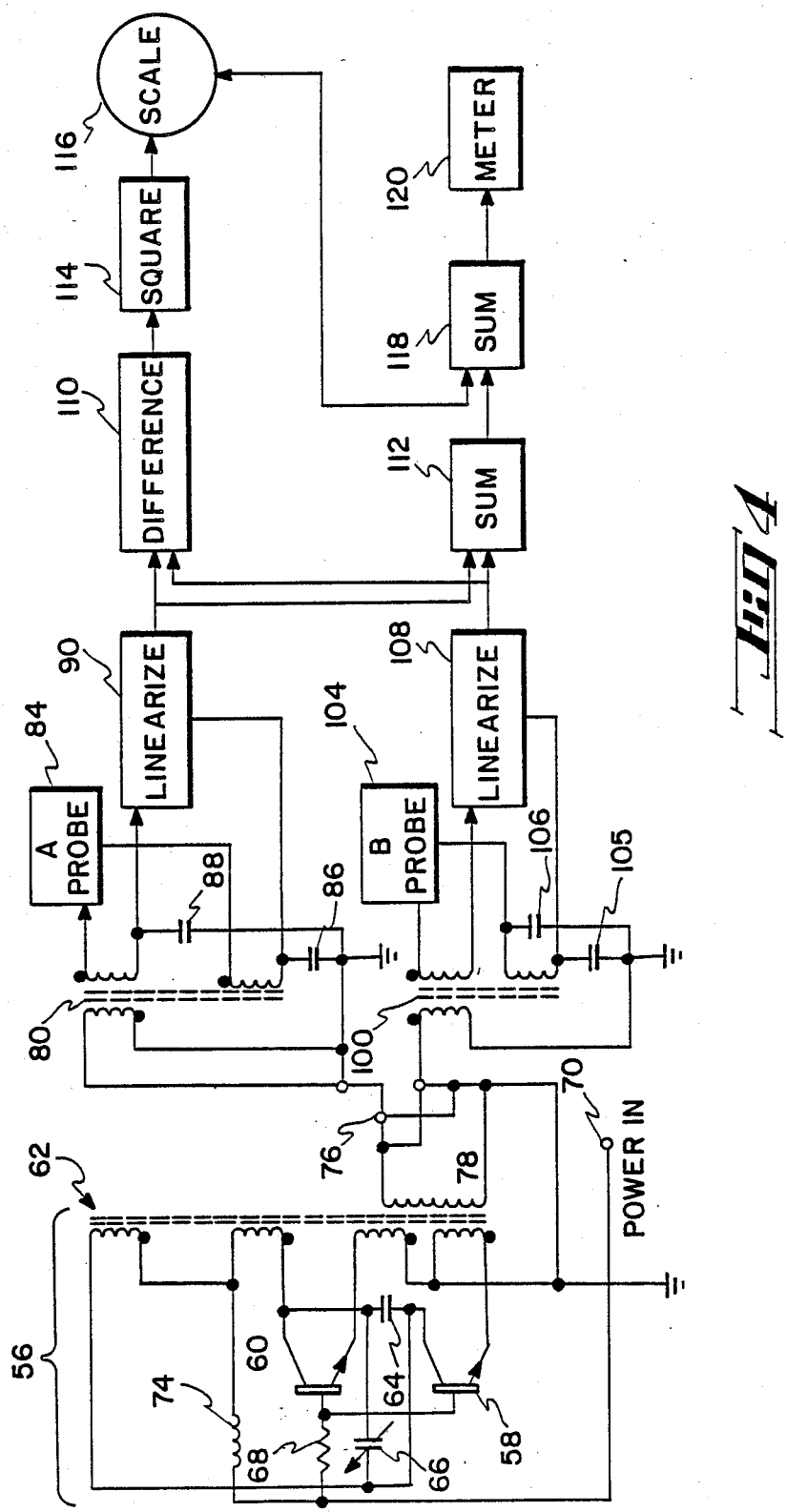

MULTI-PROBE GROUPING SYSTEM WITH NONLINEAR ERROR CORRECTION

FIELD, BACKGROUND AND SUMMARY OF THE INVENTION

In U.S. Pat. No. 3,990,005, commonly assigned to the present assignee, and incorporated herein by reference, there is disclosed a system for capcitively gauging the thickness, typically of a semiconductor wafer, utilizing two distance gauging probes placed on opposing sides of the wafer. The disclosure there provides a means for establishing an accurate measure of thickness, or other properties, in the case where the semiconductor wafer is either ungrounded or of such resistance to ground that the potential of the wafer is not controllable, resulting from error in the measurement. In one embodiment, the source of error from an ungrounded wafer is compensated by applying alternating current excitation to the probes in phase opposition which, where the wafer is substantially centered between the probes, avoids this error source.

An additional error source will be present dependent upon the displacement of the wafer from the centered condition and such error will have a relationship to the off centered position which is radically nonlinear, having error terms of a higher order than a linear relationship, typically being quadratic.

The present invention provides a system for compensating for that off-center error by processing the probe output signals in a manner to develop an offset error compensating signal which is combined with the probe output in such manner as to substantially reduce higher order error components in the thickness signal, as a function of the off-center position.

While the invention finds particular application in the semiconductor thickness gauging field for compensating for error in the wafer offset position it is additionally useful in other environments where a plurality of distance measuring probes are spaced from an object and where the resulting probe output signals are combined in such manner that an error function reflective of differences in probe spacing from the object from a nominal, typically equal distance, generates higher order error functions.

DESCRIPTION OF THE DRAWING

These and other features of the present invention are more fully set forth below in the solely exemplary detailed description and accompanying drawing of which:

FIG. 1 is a generalized block diagram of offset compensating circuitry according to the present invention;

FIG. 2 is a graphical representation of the offset error compensated for by the present invention;

FIG. 3 is a diagram presenting probe spacing;

FIG. 4 is a circuit diagram of a thickness gauging system utilizing circuitry compensating for both an ungrounded element being thickness gauged and for a element offset in position from the center between the thickness gauging probes.

DETAILED DESCRIPTION

The present invention contemplates a multi-probe system for sensing probe to object distance and for processing the probe outputs to produce a signal having an error function representative and varying with higher order functions of the differences in probe to object distances, wherein compensating circuitry is applied to correct for such higher order errors.

In particular, as shown in FIG. 1 the present invention is particularly applicable to a thickness gauging system in which first and second probes 12 and 14, driven by an oscillator 16, are placed on opposite sides of a semiconductor wafer 18 in such manner as to gauge the distance between the wafer 18 and the probes 12 and 14. Output signals from the probes 12 and 14 are applied to respective linearizer circuits 20 and 22 which operate on the DC output of the probes to linearize the signals with respect to probed distances, as known in the art.

The output of the linearizing circuits 20 and 22 is applied to respective difference and sum circuits 24 and 26. The output of the difference circuit 24, representing the difference in distance sensed by the probes 12 and 14, and in effect thereby representing the displacement of the element 18 from a position centered between the probes 12 and 14, is applied to a circuit 28 which performs an exponential expansion on the difference signal, in this case providing the square of the difference signal. this exponential expansion is applied through a scaling circuit 30 which provides multiplication by a constant on the output of the squaring circuit 28. The outputs of the summing circuit 26 and the scaling circuit 30 are summed in a further summing circuit 32 with the output thereof applied to an indicator or meter 34 or additional utilization circuitry. The signal from the summer 32 represents a thickness of the wafer 18 compensated for higher order errors resulting from offset of the element 18 from a position centered between the probes 12 and 14. The scaling circuit typically allows calibration of the system for one specific set of capacitance determining conditions such as wafer diameter and may need readjusting with a different wafer diameter.

FIG. 2 represents a graphical view of this error. A curve 36 indicates a non-linear, substantially quadratic relationship, between off-center position and error in thickness output. The differencing circuit 24 provides a signal representative of this offset position and the exponential expansion circuit 28 converts it into a non-linear function approximating the curve 36. As can be seen from FIG. 3, the distances A and B represent the spacing of the element 18 from the capacitive plates 38 and 40 of the probes 12 and 14.

In actual application, the semiconductor element 18 will be ungrounded and thereby an additional error will be introduced resulting from the fact that the actual potential of the wafer 18 is unknown with respect to the capacitive plates 38 and 40. To compensate for this, circuitry illustrated in FIG. 4, and shown in the above-identified '005 patent, incorporated herein by reference, is utilized, as one exemplary manner of avoiding this error. In particular, the circuitry of FIG. 4 operates to apply excitation to the plates 38 and 40 of the capacitive probes 12 and 14 out of phase, in this case 180° out of phase, in order to cause the potential of th plate 18 to essentially stay at circuit common or ground, or a predetermined and substantially non-varying potential. The circuitry for accomplishing the includes a single oscillator circuit 56 having transistors 58 and 60 connected with their bases together, and with their collectors connected through first and second coils of a transformer 62 to provide feedback to further transformer coils which are connected in series in the emitter circuits of transistors 58. The collectors are additionally connected together through parallel capacitors 64 and 66, capacitor 66 being variable and an adjustment on the capacitance and accordingly frequency. A base biasing resistor 68 is connected to a power input terminal 70. Similarly, the junction between the collector circuit coils of the transformer 62 is applied through a choke coil 74 to the terminal 70.

A secondary coil of transformer 62 is connected to ground on one end while the other end is taken as the oscillator output. This output is split into two lines which are conducted through cables 76 and 78 to the respective probe circuitry. The AC excitation through the cable 76 is applied to a primary coil of a transformer 80, the other end of the coil being connected to ground. The secondary of the transformer 80 has first and second coils, one side from each coil being applied to a probe 84 and the other sides being AC grounded through capacitors 86 and 88. The DC signal output of the probe 84 is passed through a linearizer 90 to sum and difference circuits 112 and 110.

The probe 84 may be of the same design as indicated in the above referenced U.S. Pat. No. 3,990,005.

The signal on cable 78 is similarly applied to a probe circuit through the primary coil of a transformer 100. The secondary of the transformer 100 comprises first and second coils, one end of each of which is applied to a probe 104 for the capacitive proximity gauging of the distance B. The other end of the secondary coils are AC grounded through capacitors 105 and 106 with the DC signal across them applied through a linearizer 108. A single line input to linearizers 90 and 108 may be obtained by shunting capacitors 86 and 105 as may be convenient for use in circuitry described below.

The outputs of the linearizers 90 and 108 are applied respectively to difference and summing circuits 110 and 112 as described above. The output of the difference circuit is applied to a squaring circuit 114 and its output in turn applied through a scale factor circuit 116. A summing circuit 118 receives the output of the summer 112 and scaling circuit 116 and provides a sum output to a meter, indicating or other utilization device 120.

The thus described invention of FIG. 4 provides for compensation both of the effect of an ungrounded element to which gauging is applied and to the errors resulting from an offset in the position of the object between gauges, or in the general case an inequality in the distance between the plural probes and the object being gauged. The invention is used in other configurations as well. For example, elements 24-34 can be substituted for the element 126 of the above referenced '005 patent.

The invention is described above with respect to exemplary embodiments, the scope of the invention is thereby to be defined solely with respect to the following claims.

We claim:

1. A multi-probe system for gauging a parameter in which factors dependent upon probe to object distance variation between probes are compensated comprising:
    a plurality of distance gauging probes each operative to provide a probe output representative of the distances between the corresponding probe and an object;
    means for electrically processing said probe outputs to provide output representations which vary non-linearly as a function of each of the distances from said plural probes to said object;
    said output representation having a non-linear error function having first and higher order components representative of a difference in distance between said plural probes and said objects;
    said processing means including means for applying to the output representation thereof, a signal having a component varying non-linearly therewith to compensate said output representation for said non-linear error functions, wherein said processing means further includes;
    means for summing the outputs of said plural probes;
    means for differencing the outputs of said plural probes to produce a difference representing signal;
    means for expanding said difference signal to a power greater than one; and
    means for combining said expanded signal with the summed probe outputs to produce a compensated system output.

2. The system of claim 1 wherein said means for expanding includes means for squaring.

3. The system of claim 1 further including means for scaling the output of said expanding means.

4. The system of claim 1 wherein said probes include first and second probes placed on opposite sides of a material of thickness to be gauged and wherein said processing means includes means for providing as said output representation a signal representative of the thickness of said object.

5. The system of claim 4 wherein said processing means includes:
    means for summing and differencing the outputs of said plural probes;
    means for squaring and scaling the output of said differencing means; and
    means for combining the squared scaled output of said differencing means with the output of said summing means.

6. The system of claim 1 further including means for linearizing the output representation of each of said plural probes.

7. The system of claim 1 further including means for linearizing the output representation of said plural probes.

8. The system of claim 5 further including means for linearizing the output representation of said plural probes.

9. The system of claim 1 wherein:
    said object presents a substantial impedance to a circuit point common with respect to said plural probes;
    means are provided for compensating said probe output representations for a potential at said object resulting from said substantial impedance.

10. The system of claim 9 wherein:
    said means for compensating for said substantial impedance includes means for causing out of phase excitation of each of said plural probes with respect to the other.

11. The system of claim 10 wherein said probes are capacitive probes and said out of phase excitation causes a potential of said object to remain substantially intermediate in potential with respect to capacitive elements of said probes;
    said probes include capacitive elements excited in response to said signal with said out of phase excitation signal.

* * * * *

UNITED STATES PATENT AND TRADEMARK OFFICE
CERTIFICATE OF CORRECTION

PATENT NO. : 4,910,453

DATED : March 20, 1990

INVENTOR(S) : Robert C. Abbe and Noel S. Poduje

It is certified that error appears in the above-identified patent and that said Letters Patent is hereby corrected as shown below:

On the title page

In the first line identified as [54], "MULTI-PROBE GROUPING" should read --MULTI-PROBE GAUGING-- in the Title of the invention.

Column 1, line 2, "MULTI-PROBE GROUPING" should read --MULTI-PROBE GAUGING--.

Column 1, line 9, "capcitively gauging the" should read --capacitively gauging the --, Column 2, line 23, "this exponential expansion" should read --This exponential expansion--.

Column 2, line 57, "potential of th plate 18" should read --potential of the plate 18--.

Column 2, line 60, "circuitry for accomplishing the" should read --circuitry for accomplishing this--.

Column 3, line 26, "the capactive proximity" should read --the capacitive proximity--.

UNITED STATES PATENT AND TRADEMARK OFFICE
CERTIFICATE OF CORRECTION

PATENT NO. : 4,910,453

DATED : March 20, 1990

INVENTOR(S) : Robert C. Abbe, et. al.

It is certified that error appears in the above-identified patent and that said Letters Patent is hereby corrected as shown below:

Column 4, line 60, "capactive probes" should read -- capacitive probes--.

Signed and Sealed this

Eighteenth Day of August, 1992

*Attest:*

DOUGLAS B. COMER

*Attesting Officer*      Acting Commissioner of Patents and Trademarks